United States Patent
Burns et al.

(10) Patent No.: US 9,436,859 B2
(45) Date of Patent: Sep. 6, 2016

(54) AD HOC LOCALIZATION USING A MOVABLE READER AND MOVABLE ID TAGS

(71) Applicant: GLOBALFOUNDRIES INC., Grand Cayman (KY)

(72) Inventors: Zachary A. Burns, Poughkeepsie, NY (US); Yuk L. Chan, Rochester, NY (US); Kin K. Choi, Poughkeepsie, NY (US); David J. B. Flaherty, Poughkeepsie, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 54 days.

(21) Appl. No.: 14/500,096

(22) Filed: Sep. 29, 2014

(65) Prior Publication Data

US 2016/0092708 A1   Mar. 31, 2016

(51) Int. Cl.
| | |
|---|---|
| *G06K 7/10* | (2006.01) |
| *G01S 1/70* | (2006.01) |
| *G08B 13/24* | (2006.01) |
| *G01S 11/02* | (2010.01) |
| *G01S 13/75* | (2006.01) |

(52) U.S. Cl.
CPC ............. *G06K 7/10366* (2013.01); *G01S 1/70* (2013.01); *G01S 11/02* (2013.01); *G01S 13/75* (2013.01); *G06K 7/10297* (2013.01); *G08B 13/2462* (2013.01)

(58) Field of Classification Search
CPC ........... G06K 7/0008; G06K 19/0723; G06K 7/10009; G06K 7/10366; G06K 7/10316; G06K 19/0717; G06K 19/07749
USPC ....................................................... 340/10.1
See application file for complete search history.

(56) References Cited

U.S. PATENT DOCUMENTS

| | | | | |
|---|---|---|---|---|
| 7,044,373 B1* | 5/2006 | Garber | ................. | G06K 7/0008 235/375 |
| 7,260,369 B2* | 8/2007 | Feher | ..................... | H04M 11/04 342/450 |
| 7,528,721 B2* | 5/2009 | Levin | ........................ | G01S 1/54 235/375 |
| 7,639,138 B2* | 12/2009 | Chang | ..................... | G01S 3/046 340/13.31 |
| 7,782,194 B2* | 8/2010 | Stawar | .................. | B62B 3/1408 224/411 |
| 8,477,013 B2* | 7/2013 | Sarma | ........................ | G01S 1/68 340/572.1 |
| 8,758,102 B2* | 6/2014 | Block | .................... | G06Q 30/02 463/1 |
| 9,020,687 B2* | 4/2015 | Mendelson | .............. | G08G 1/14 701/31.5 |

(Continued)

FOREIGN PATENT DOCUMENTS

| | | |
|---|---|---|
| EP | 2395488 A1 | 12/2011 |
| WO | 2012044524 A1 | 4/2012 |

OTHER PUBLICATIONS

A. Norman, et al., "Consumer Acceptance of RFID-Enabled Services in Validating Halal Status," IEEE, ISCIT 2009, pp. 911-915.

(Continued)

*Primary Examiner* — Mark Blouin
(74) *Attorney, Agent, or Firm* — David A. Cain, Esq.

(57) ABSTRACT

Embodiments are directed to a method of identifying an identification (ID) tag. The method includes using a movable reader to determine a presence of an ID tag, an absence of the ID tag and that the ID tag has moved. The method further includes using the movable reader to determine a localization probability score of the ID tag, and, based on the localization probability score, adjust the movable reader's determination of the presence of the ID tag.

19 Claims, 10 Drawing Sheets

(56) References Cited

U.S. PATENT DOCUMENTS

| | | | |
|---|---|---|---|
| 9,235,823 B2* | 1/2016 | Rushing | G06Q 10/0833 |
| 2007/0241904 A1 | 10/2007 | Ozaki et al. | |
| 2008/0042847 A1* | 2/2008 | Hollister | G01S 13/825 |
| | | | 340/572.7 |
| 2013/0069985 A1 | 3/2013 | Wong et al. | |
| 2014/0074667 A1* | 3/2014 | Smith | G01S 5/12 |
| | | | 705/28 |

OTHER PUBLICATIONS

Cory Hekimian-Williams, et al., "Accurate Localization of RFID Tags Using Phase Difference", IEEE RFID 2010, Apr. 2010, pp. 89-96.

M. Bouet, et al., "RFID Tags: Positioning Principles and Localization Techniques," WD '08. 1st IFIP Wireless Days, IEEE, Nov. 24-27, 2008, pp. 1-5.

\* cited by examiner

| ID TAG | READER LOCATION | DISTANCE FROM READER TO ID TAG | MAX RANGE READER DETECTED TAG | ID READ MISSES | ID SUCCESSFULL READS | LOCALIZATION PROBABILITY SCORE | LOCALIZATION PRIORITY SCORE | OTHER READER/TAG DATA |
|---|---|---|---|---|---|---|---|---|
| RFID TAG (206A) | DATA | DATA | DATA | DATA | NO DATA | DATA | DATA | DATA |
| RFID TAG (206B) | DATA | DATA | DATA | NO DATA | DATA | DATA | DATA | DATA |
| RFID TAG (206C) | NO DATA | NO DATA | NO DATA | NO DATA | NO DATA | NO DATA | NO DATA | NO DATA |

LOOKUP TABLE 500

FIG. 5

AD HOC LOCALIZATION USING A MOVABLE READER AND MOVABLE ID TAGS

BACKGROUND

The present disclosure relates in general to systems and methodologies for automatically detecting and locating objects. More specifically, the present disclosure relates to systems and methodologies for automatically detecting the location of movable identification (ID) tags during ad hoc, normal course movement of an ID reader attached to a relatively small computing device.

Small mobile computing systems enable the continued integration of computer system functionality into everyday life. For example, small mobile computing systems, such as miniaturized computers, input devices, sensors, detectors, image displays, wireless communication devices as well as image and audio processors, can be integrated into a device that can be worn by a user. Such small and potentially wearable computing devices potentially provide mobile and lightweight solutions to communicating and interacting with the objects in one's environment. Such objects may include virtually anything in the subject environment. For example, in a home environment, such objects may include shoes, clothing, appliances, televisions, garage door openers, alarm systems, indoor or outdoor lighting systems, and the like.

In order to realize their full potential, small and potentially wearable computing devices must be able to accurately and efficiently identify, locate and track objects in the subject environment. Contemporary configurations for object ID systems include a reader in communication with an ID tag attached to an object of interest. Radio frequency ID (RFID) is one example of a suitable object ID technology. A typical RFID system uses an RFID reader to store and remotely retrieve location data from relatively inexpensive passive RFID tags attached to the object.

However, several constraints impact the ability to implement a contemporary object ID system in a small computing device. These constraints are imposed by requirements of the ID system, the small computing system and the desired operating environment. Such constraints potentially restrict the flexibility and ease of use for small and potentially wearable computing devices, which preferably have the capability to function effectively in a relatively unstructured and less controlled environment, such as a home or an office.

SUMMARY

Embodiments are directed to a method of identifying an identification (ID) tag. The method includes using a movable reader to determine a presence of an ID tag, an absence of the ID tag and that the ID tag has moved. The method further includes using the movable reader to determine a localization probability score of the ID tag, and, based on the localization probability score, adjust the movable reader's determination of the presence of the ID tag.

Embodiments are further directed to an object ID system having a moveable reader. The movable reader is configured to define, adjust and track a first trigger zone of a first ID tag by determining a presence of the first ID tag within the first trigger zone. The movable reader is further configured to define, adjust and track a first miss zone of the first ID tag by determining an absence of the first ID tag from the first miss zone. The movable reader is further configured to determine a first localization probability score of the first ID tag. The first localization probability score represents a likelihood that the movable reader will, while at a first current location, determine the presence of the first ID tag.

Embodiments are further directed to an object ID system having a first movable reader, a second movable reader and a communications network. The first movable reader is configured to define, adjust and track a first trigger zone of a first ID tag by determining a presence of the first ID tag within the first trigger zone. The second movable reader is configured to define, adjust and track the first trigger zone of the first ID tag by determining the presence of the first ID tag within the first trigger zone. The communications network connects the first movable reader and the second movable reader. The first movable reader is further configured to access and utilize, through the network, stored data of the second movable reader to define, adjust and track the first trigger zone of the first ID tag.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 5 depicts an example of a lookup table format in accordance with one or more embodiments;

Figure 1:
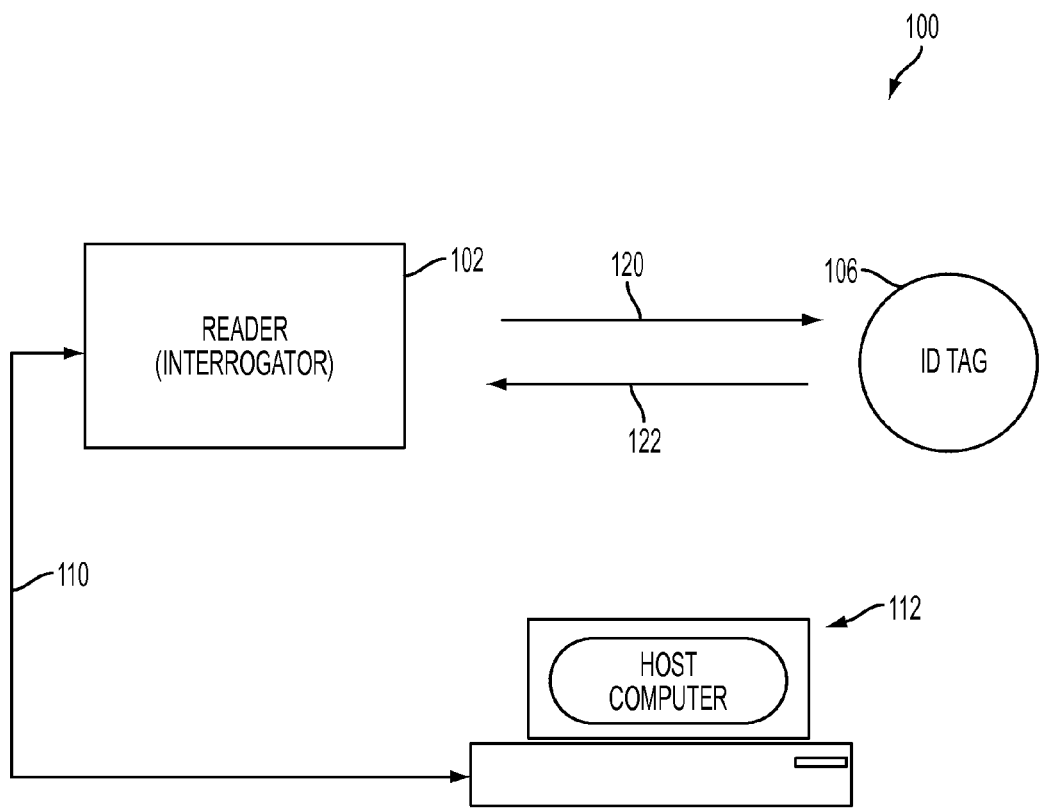
FIG. 1 depicts a block diagram illustrating an example of an object identification system in accordance with one or more embodiments.

In the accompanying figures and following detailed description of the disclosed embodiments, the various elements illustrated in the figures are provided with three digit reference numbers. The leftmost digits of each reference number corresponds to the figure in which its element is first illustrated.

DETAILED DESCRIPTION

It is understood in advance that although this disclosure includes embodiments that utilize certain object identification technologies, such as RFID, GPS, collision resolution, trilateration, directional reads, and others, implementation of the teachings recited herein are not limited to these technologies. Rather, embodiments of the present disclosure are capable of being implemented in conjunction with any other type of object ID technology now known or later developed.

As previously noted, in order to realize technological advances, relatively small and potentially wearable computing systems must be able to accurately and efficiently identify, locate and track objects in their environment. A contemporary configuration for an object ID system includes a reader in communication with an ID tag attached to an object of interest. Radio frequency ID (RFID) is one example of an automatic ID system that uses an RFID reader to store and remotely retrieve location data from relatively inexpensive passive RFID tags attached to the object.

However, several constraints impact the ability to implement a contemporary object ID system in a small and potentially wearable computing device. These constraints are imposed by requirements of the ID system, the small computing system and the desired operating environment. Such constraints potentially restrict the flexibility and ease of use for small and potentially wearable computing devices, which preferably have the capability to function effectively in a relatively unstructured and less controlled environment, such as a home or an office. For example, trilateration is a localization methodology that can be used to track objects in a well controlled environment. Implementing a typical trilateration methodology within a wearable computing device requires the user to either carefully place the wearable computing device and its associated reader in four (4) positions sequentially for each object, or provide the wearable computing device with four (4) RFID antennas. Because obtaining reliable read data requires sufficient space between each antenna, placing all antennas necessary for localization on certain wearable computing devices (e.g., a wristwatch) can be impractical. For ease of operation, it is preferable that ID systems of a wearable computing device identify, locate and track ID tags during the ad hoc, unstructured movements of the person wearing the wearable computing device, preferably without human awareness, and without the wearer having to purposely assisting the detection. Additionally, if data is to be gathered during ad hoc, unstructured movements of a person wearing the wearable computing device, the time between individual readings from a given ID tag might be several hours or even days. During this time, the object (e.g., a handbag, or a pair of shoes) could be moved. Thus, to maintain accuracy, continuous detection and tracking of existing ID tags, as well as the discovery of new ID tags, are necessary.

Furthermore, cost considerations dictate the use of inexpensive, low-tech passive ID tags having relatively weak signals and short detection ranges. This further complicates the ability to use a trilateration process to accumulate multiple (e.g., 3 or more) distinct tag readings from multiple distinct positions, with each reading having to occur within relatively close range (e.g., within approximately 20 cm). These relatively weak signals are also easily blocked, for example, by walls or another object between the reader and the ID tag. Signal collisions often occur when attempting to detect multiple tags, and resolving these collisions requires sequential readings that can take time to accumulate. Thus, resolving collisions is also more difficult in the above-described unstructured, less controlled and high tag density environments.

Turning now to an overview of the disclosed embodiments, the present disclosure provides systems and methodologies for detecting the location of movable ID tags during ad hoc, normal course movements of an ID reader incorporated in a relatively small and potentially wearable computing device. The present disclosure provides systems and methodologies for detecting objects and their locations as a user is walking around a room randomly without purposely positioning the ID reader.

In operation, the present disclosure includes an object identification (ID) system having at least one movable reader configured to define, adjust and track a trigger zone of an ID tag. The trigger zone is a three dimensional (3D) region in which the ID tag might be located. The movable reader defines the trigger zone by searching for and determining, during ad hoc movement of the movable reader, a presence of the ID tag using received signal strength indicator (RSSI) or time of flight techniques wherein a single detection identifies a distance between the ID reader and the ID tag but no direction. Thus, the ID reader is the center of the trigger zone sphere, and the distance from the ID reader to the ID tag defines the radius of the trigger zone sphere. The ID reader now knows that the ID tag is located somewhere on the trigger zone sphere, and the ID tag is marked as "semi-detected." This distance will be the current maximum distance from Reader to the ID tag. Each time this ID Reader detects the ID tag, the maximum distance from Reader to the ID tag is adjusted. As this maximum distance changes, the radius of the previously defined trigger zone sphere will also be adjusted dynamically.

Similarly, the movable reader is further configured to define, adjust and track a plurality of individual miss zones for an ID tag. Each individual miss zone is a three dimensional (3D) region in which the tag was not located. The movable reader defines each individual miss zone by searching for and determining, during ad hoc movement of the movable reader, an absence of the ID. Thus, the ID reader is the center of the individual miss zone sphere, and the maximum detection distance between the ID reader and the ID tag defines the radius of the individual miss zone sphere. The ID reader now knows that, for at least the current reading, the ID tag was not located somewhere on the individual miss zone sphere. The plurality of individual miss zone spheres for a given ID tag are tracked such that a total miss zone of the ID tag consists of the totality of the accumulated individual miss zone spheres.

To accommodate the environmental, cost and size constraints of a small and potentially wearable object ID system, the disclosed object ID system utilizes at least one reader that processes ID tag readings one at a time over a relatively long period of time. In order to conserve system resources and improve overall system efficiency, the movable reader is further configured to determine and track a localization probability score based on proximity of the moveable reader to the trigger zone and the miss zone of a given ID tag. The localization probability score represents the likelihood that a movable reader in a particular location will determine the presence of a given ID tag. The movable reader is further configured to adjust the system resources that are devoted to searching for the presence of an ID tag based on that tag's probability score. In general, if an ID reader is in a location where the probability scores for a set of tags are low, there is hence a low probability of locating any of the low-probability tags at that location. Thus, system resources are directed away from searching for ID tags each having a low probability score (e.g., below a chosen threshold) and directed toward ID tags each having a higher probability score (e.g., above a chosen threshold).

In addition to partitioning system resources between ID tags having low localization probability scores and ID tags having high localization probability scores, the probability scores are also used to partition search resources among the ID tags having higher localization probability scores, thereby prioritizing the localization of ID tags having the highest localization probability scores.

The moveable reader continues to use a trilateration process to define, adjust and track a trigger zone of a semi-detected ID tag until the results indicate that a probable location of the ID tag has been determined. Because the ID tag may have been moved during the trilateration process, there is a possibility that the initial determination that the tag has been located could be wrong. Hence, the trilateration results are labeled as a "potential" localization, and the trilateration process is supplemented with a directional read process. A directional read is an accurate method of identifying an object's location, but it typically takes up significant system resources and requires time to complete. Here, the accumulated data for the potentially located ID tag is drawn upon to focus and streamline the directional read process so it consumes far fewer resources and requires much less time to complete than a full directional read process. If the streamlined directional read is successful, the ID tag location is now marked as "verified." If the streamlined directional read process is unsuccessful, the tag location is returned to an undetermined status. Alternatively, when the trigger zone of a semi-detected ID tag contains only a few probable locations of the ID tag, the directional read process could be applied to each of the probable locations as the final reads for the trilateration process.

The present disclosure further includes a methodology for processing a situation in which an ID tag moves after its location has been verified. After verification, the object ID system periodically checks to see if the verified ID tag is in the same location. If a periodic update of a previously verified ID tag location indicates that the ID tag has been moved, the system places the ID tag in a line for subsequent searching. If, as part of the subsequent searching process, the same ID tag is semi-detected again, the system draws on existing information for that ID tag to streamline subsequent processing. If there is overlap between the immediately preceding trigger zone and the current trigger zone, the system moves processing to the above-described verification/directional read process. If there is no overlap between the immediately preceding trigger zone and the current trigger zone, the system moves processing to the above-described semi-detected/trilateration process.

The present disclosure further includes connecting the above-described movable reader to other, selected movable readers in a local network. For example, in a single household application, two or more members of the household may have individual ID readers that are each gathering data about the same ID tags in the same environment. Via the local network, individual readers can exchange stored information about ID tags. Thus, each movable ID reader on the network can draw on the information accumulated in other movable readers on the same network when performing the above-described localization probability calculations, semi-detection process, potential localization process and verification process, thereby working both individually and jointly to identify, locate and track ID tags. Such a network can increase the validation frequency of object location for the object ID system, which is a concept similar to crowd sourcing.

Turning now to the drawings in greater detail, wherein like reference numerals indicate like elements, FIG. 1 illustrates an exemplary object identification (ID) system 100 capable of using one or more embodiments of the present disclosure. As shown, ID system 100 includes a reader/interrogator 102, an ID tag 106, a communications path 110 and a host computer 112, configured and arranged as shown. Signals 120, 122 are transmitted between reader 102 and ID tag 106 to identify, locate and track ID tag 106, which may be attached to a variety of items (not shown) such as people, assets or animals, for purposes of identifying, locating and/or tracking the items. As previously noted herein, ID system 100 may be implemented using a wide variety of technologies without departing from the teachings of the present disclosure. Accordingly, embodiments of the present disclosure are capable of being implemented in conjunction with any type of object ID technology now known or later developed.

Figure 2:
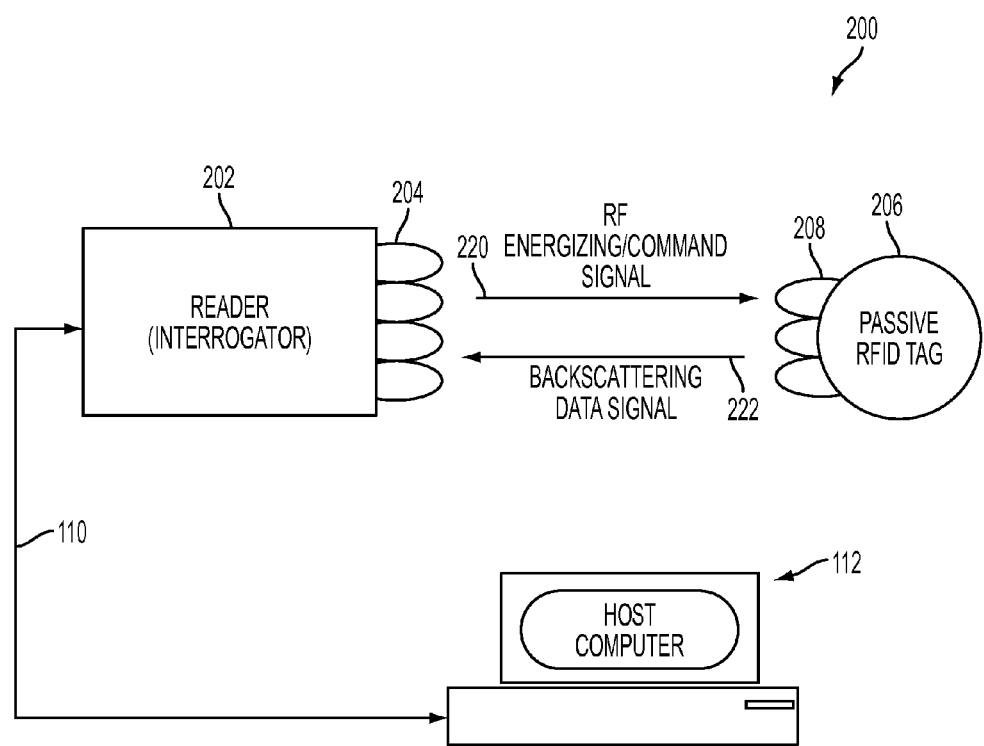
FIG. 2 depicts a block diagram illustrating an example of an RFID system in accordance with one or more embodiments.

FIG. 2 illustrates an exemplary object ID system that utilizes RFID technology. As shown, an RFID system 200 includes an RFID reader 202, RFID reader antenna coil 204, RFID tag 206, RFID tag antenna coil 208, a communications path 110 and a host computer 112, configured and arranged as shown. RFID system 200 uses radio frequency signals to identify, locate and track RFID tag 206, which may be attached to a variety of items (not shown) such as people, assets or animals, for purposes of identifying, locating and/or tracking the items. RFID tag 206 may be composed of antenna coil 208 and a silicon chip (not shown) that includes basic modulation circuitry and non-volatile memory (not shown). RFID tag 206 may be energized by a time-varying electromagnetic radio frequency (RF) wave that is transmitted by RFID reader 202. This RF energizing signal 220 is often referred to as the carrier signal. When the RF field of energizing signal 220 passes through RFID tag antenna coil 208, there is an AC voltage generated across antenna coil 208. This voltage is rectified to a DC voltage for RFID tag 206 operation. RFID tag 206 becomes functional when the DC voltage reaches a certain level. Information stored in RFID tag 206 is transmitted back to RFID reader 202 via a modulated backscatter signal 222. Backscatter modulation refers to a communication method used by a passive RFID tags to send data to back to an RFID reader using the RFID reader's energizing carrier signal. By detecting modulated backscattering signal 222, RFID reader 202 receives information stored in RFID tag 206 and uses the received information to identify, locate and or track RFID tag 206 and its associated item.

Because of its simple design and relatively low cost, passive RFID tags have been used for many years in various RF remote sensing applications. Because passive RFID tags are remotely powered by the RFID reader's transmitted RF signal, it deals with very small power (~μw). Thus, the read range (communication distance between reader and tag) is typically limited to within relatively close proximity distances. Typical RFID tag read ranges vary with a variety of design parameters such as frequency, RF power level, the RFID reader's receiving sensitivity, size of the RFID reader antenna, data rate, communications protocol, etc. The current maximum distance from the Reader to the ID tag is a way to track the known functioning range. If the same Reader is within the maximum distance from the Reader to the ID tag, the ID tag is guaranteed to be detectable by the Reader if there are no obstacles in between.

Host computer 112 provides computer processing power to support the various RFID data calculations that must be performed in order to identify, locate and/or track RFID tag 206 and its associated item. Depending on the size and/or configuration of RFID reader 202, the functionality in host computer 112 may be integrated within RFID reader 202, or provided separately as shown in FIGS. 1 and 2. Communications channel 110 between RFID reader 202 and host computer 112 may be wired or wireless or a combination of both. Among the various known RFID calculations/processes that are important to the identification, location and/or tracking of RFID tag 206, the processes that are most relevant to the present disclosure include trilateration processes, directional read processes and collision resolution processes. Examples of these processes are described in the following publications: RFID Tags: Positioning Principles and Localization Techniques, by Mathieu Bouet and Andri L. dos Santos; Accurate Localization of RFID Tags Using Phase Difference, by Cory Hekimian-Williams, Brandon Grant, Xiuwen Liu, Zhenghao Zhang, and Piyush Kumar, Department of Computer Science, Florida State University, Tallahassee, Fla.; published U.S. patent application US20080042847A1, bearing U.S. application Ser. No. 11/502,773, published Feb. 21, 2008, entitled Method For Reading RFID Tags Using Directional Antennas; and published U.S. patent application US20070241904A1, bearing U.S. application Ser. No. 11/727,777, published Oct. 18, 2007, entitled RFID Tag Distance Measuring System and Reader. The entire disclosure of each of the above-identified publications is incorporated by reference herein, in its entirety.

Figure 3:
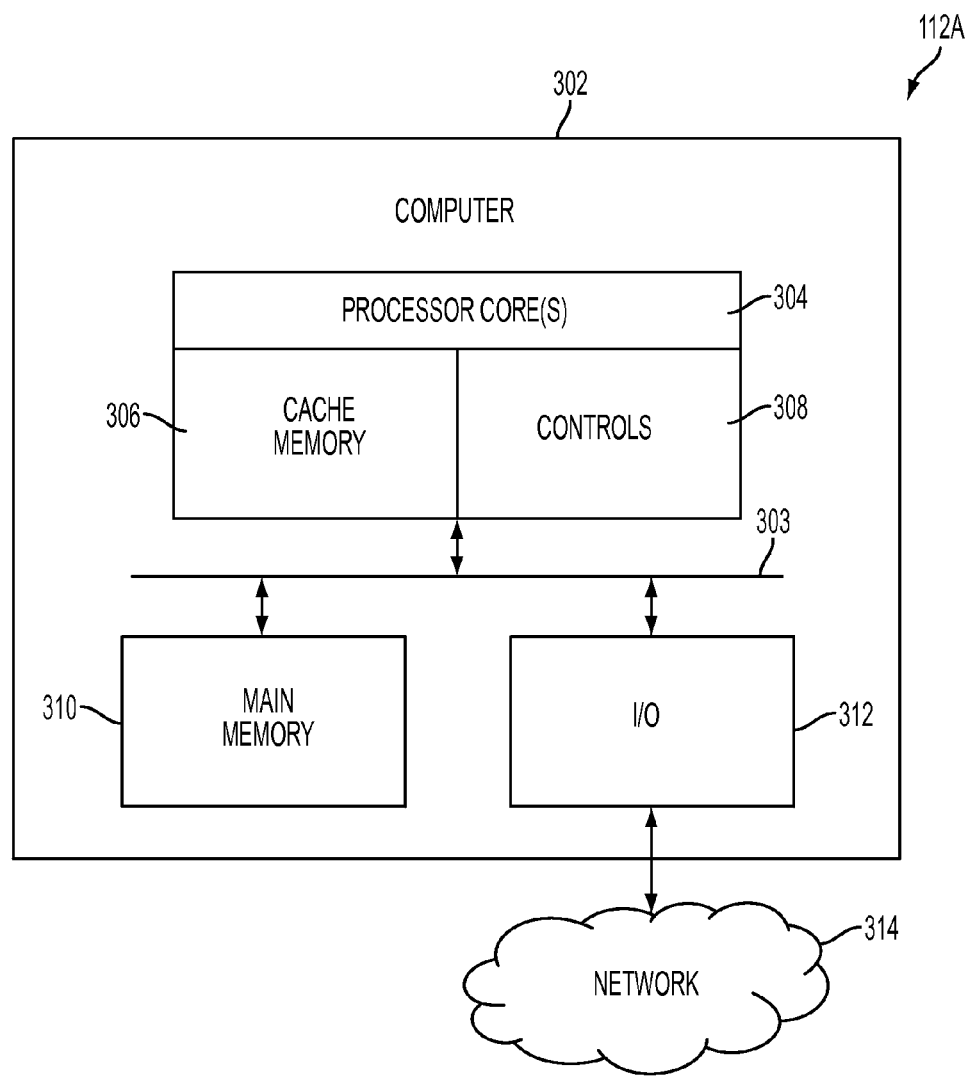
FIG. 3 depicts an example of the host computer functionality shown in FIG. 2 in accordance with one or more embodiments.

FIG. 3 illustrates at 112A a more detailed example of host computer 112 (shown FIGS. 1 and 2). Host computer 112A includes an exemplary computing device ("computer") 302, a network 314, which connects computer 302 to additional systems (not depicted) and may include one or more wide area networks (WANs) and/or local area networks (LANs) such as the internet, intranet(s), and/or wireless communication network(s). Exemplary host computer 112A further includes processor cores 304, main memory ("memory") 310, and input/output component(s) 312, which are in communication via bus 303. Processor cores 304 include cache memory ("cache") 306 and controls 308. Cache 306 may include multiple cache levels (not depicted) that are on or off-chip from processor 304. Memory 310 may include various data stored therein, e.g., instructions, software, routines, etc., which, e.g., may be transferred to/from cache 306 by controls 308 for execution by processor 304. Input/output component(s) 312 may include one or more components that facilitate local and/or remote input/output operations to/from host computer 112A, such as modems, network adapters, etc. (not depicted). Although a single host computer system 112A is shown for ease of illustration, the functionality of host computer 112A, along with the various processes described herein, may be implemented across a plurality of computers. Additionally, as previously noted, the entire functionality of host computer 112A may be integrated into RFID reader 202 (shown in FIG. 2) and/or ID reader 102 (shown in FIG. 1) instead of provided in a separate device.

Figure 4:
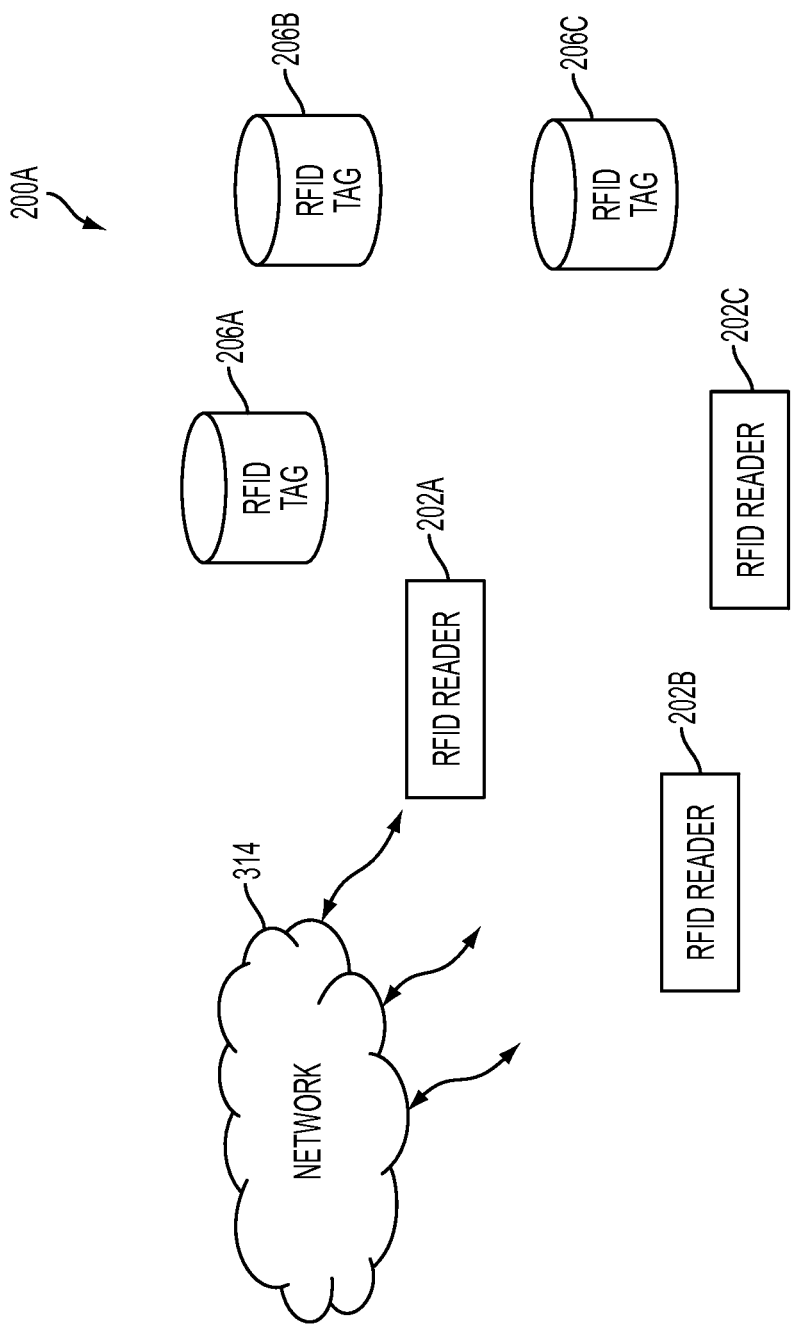
FIG. 4 depicts a diagram illustrating another example of an RFID system in accordance with one or more embodiments.

FIG. 4 depicts a diagram illustrating another example of an RFID system 200A in accordance with one or more embodiments. As shown, RFID system 200A includes an RFID reader 202A, an RFID reader 202B, an RFID reader 202C, an RFID tag 206A, an RFID tag 206B, an RFID reader 202C, and a network communication system, configured and arranged as shown. RFID system 200A allows communication between RFID readers 202A, 202B, 202C via communications network 314. RFID system 200A has application, for example, in a single household implementation wherein two or more members of the household may have individual RFID readers that are each gathering data about the same ID tags in the same environment. Via local network 314, individual readers (e.g., 202A, 202B, 202C) can exchange stored information about RFID tags (206A, 206B, 206C). Thus, each movable RFID reader on network 314 can draw on the information accumulated in other movable readers on network 314 when performing the disclosed localization probability calculations, semi-detection process, potential localization process and verification process, thereby working both individually and jointly to identify, locate and track ID tags. Such a network can increase the validation frequency of object location for the object ID system, which is a concept similar to crowd sourcing. Additional details of how RFID systems 200, 200A and ID system 100 operate are described and illustrated in more detail later in this disclosure.

FIG. 5 depicts an example of a lookup table 500 in accordance with one or more embodiments. Lookup table 500 accumulates data gathered via the previously described object ID systems, 100, 200, 200A shown in FIGS. 1, 2 and 4. The format and content of lookup table 500 is an example, and many formats and options are available without departing from the scope of the present disclosure. Lookup table 500 includes data relevant to the various processes performed by the object ID systems 100, 200, 200A, such as the ID tag, reader location, distance from reader to ID tag, maximum range in which the reader detected a tag, ID read misses, ID successful reads, localization probability scores, localization priority scores and other reader and tag related data. Lookup table 500 may be stored in and accessed through host computer 112, 112A (shown in FIGS. 1, 2 and 3), the functionality of which may be stand-alone or integrated within ID readers 102, 202, 202A, 202B, 202C (shown in FIGS. 1, 2 and 4).

Figure 6:
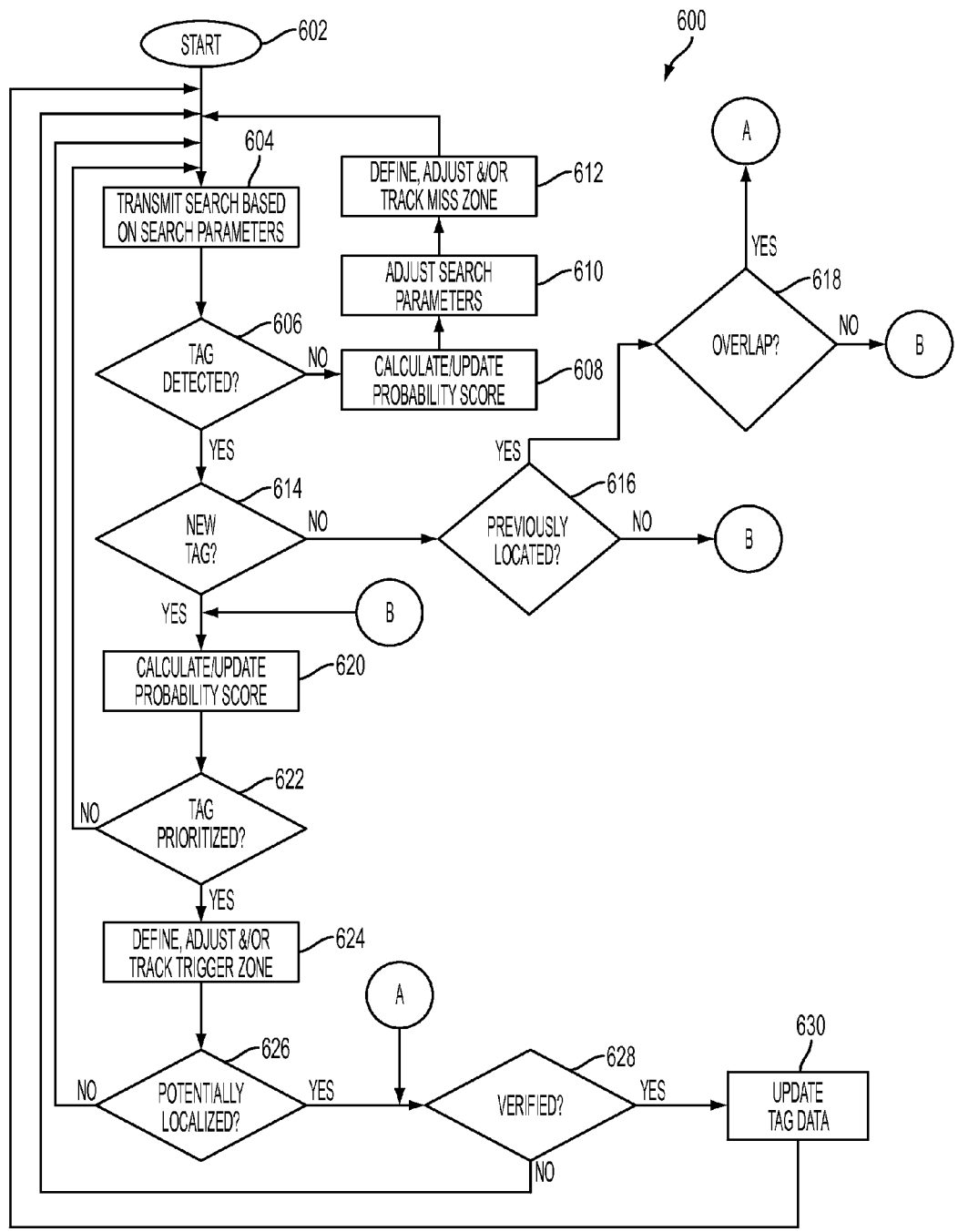
FIG. 6 depicts a flow diagram illustrating a methodology in accordance with one or more embodiments.

FIG. 6 is a flow diagram illustrating an object identification methodology 600 in accordance with one or more embodiments. In general, methodology may be implemented by the various object ID systems 100, 200, 200A (shown in FIGS. 1, 2 and 4. In describing methodology 600, for ease of description, reference will be made generally to readers, tags, lookup tables and host computing functionality. These general references apply to the specific corresponding elements shown in FIGS. 1-5. Additionally, methodology 600 is intended to convey features of the present disclosure and not necessarily the details of a particular method of detecting and localizing ID tags. The present disclosure applies broadly to many different types of object ID systems. Accordingly, the detection and localization operations in methodology 600 are described generally.

As shown in FIG. 6, methodology 600 starts at block 602. At block 604, a movable reader transmits search communications based on search parameters. The search parameters may be based on a wide variety of tag related data that has been gathered by the movable reader and stored in a lookup table for later access. The search parameters preferably include at least a localization probability score, a localization priority determination (based on a comparison of the priority scores) and a current location of the movable reader. Additionally, the search parameters may incorporate a "false-negative" methodology that would be used to compensate for blocked or otherwise weakened ID tag signals that result in a miss zone reading when in fact the ID tag is within the reader's detection range. Such a false-negative methodology may include periodically selecting certain ID tags based on selection criteria (e.g., a statistically determined likelihood of having a false-negative, the age of miss zone readings, etc.) and placing the potentially "false-negative" ID tags in the search queue for a reconfirmation of the selected miss zone readings. Further, the search parameters may utilize the above-described selection criteria based on the age of miss zone readings to periodically discard miss zone data that is not reconfirmed after a predetermined number of attempts.

Moveable reader generally processes tags by placing the tags in a queue and processing them one at a time, stretching over a potentially long period of time. Block 604 allocates resources by using the above-described search parameters. For example, the search parameters could be used to determine the tags that are placed in the queue because they are most likely to be found. Optionally, the search parameters could also be used to determine the tags that should be placed in the queue for a "false-negative" and/or aging evaluation. The selected search parameters are used to prioritize the tags from the highest localization probability scores to the lowest. As an example, block 604 could proceed under two scenarios. Under one scenario, a prioritized list of tags to search for has been assembled. Under a second scenario, a general search is made to detect anything in the surrounding region. Under scenario one, block 604 will based on using the reader's current location to determine a list of ID tags that could be detected by the reader from its current location. The list of ID tags is sorted based on the probability of success. Under scenario two, a general search is performed to identify any new ID tags not previously detected by the system. The general search could be performed on a predetermined schedule, for example, once a day. As part of the general search, the ID reader might identify "known" tags, in which case the known ID tags are processed the same as under scenario one.

Methodology 600 then moves to decision block 606 to determine if, in response to the search transmission at block 604, a tag is detected. If the response to decision block 606 is no, methodology 600 moves to block 608 to calculate/update information in the lookup table as needed, including specifically updating/calculating probability scores. Methodology 600 then moves to block 610 and adjusts the search parameters based on the actions taken at block 608. Because the tag was not detected at decision block 606, methodology 600 at block 612 further defines, adjusts and/or tracks the relevant miss zones. Additional details about the definition, adjustment and tracking of both miss zones and trigger zones are provided later in this disclosure in connection with the descriptions of FIGS. 7A to 8B. Methodology 600 then returns to the input to block 604 and the next prioritized, high probability score tag is processed. If the response to decision block 606 is yes, the reader has detected the tag within its read range, and methodology 600 proceeds to decision block 614.

Decision block 614 determines via a lookup table whether the tag is new to the system or has been previously processed. If the answer to the inquiry at decision block 614 is the latter, methodology 600 determines that the tag is not new to the system and moves to decision block 616 to determine if the previously processed tag was previously located. If the answer at decision block 616 is no, methodology 600 determines that although the identified tag is not new to the system, it has not been previously located, which means it is "semi-detected" as previously described. Methodology 600 then proceeds to connector B, which routes methodology 600 back as an input to block 620 for further processing as a semi-detected tag (described in more detail later). If the answer at decision block 616 is yes, methodology 600 determines that the identified tag has been previously located, which means the tag is currently in a "verified" status as previously described. Methodology 600 then proceeds to decision block 618 to determine if there is overlap between the current and previous trigger zones of the tag. If the answer at decision block 618 is yes, methodology 600 determines that there is overlap between the current and previous trigger zones of the tag, which means that the tag is still close to its previous location, so methodology 600 then proceeds to connector A, which routes methodology 600 back as an input to decision block 628 for further processing as a "potentially localized" tag (described in more detail later). If the answer at decision block 618 is no, methodology 600 determines that there is no overlap between the current and previous trigger zones of the tag, which means that the tag is no longer close to its previous location, so methodology 600 then proceeds to connector B, which routes methodology 600 back as an input to block 620 for further processing as a "semi-detected" tag (described in more detail later).

Returning now to decision block 614, if the answer to the inquiry at decision block 614 is yes, methodology 600 determines that the tag is new to the system and moves to block 620 for further processing as a semi-detected tag. Block 620 calculates and updates information in the lookup table as needed, including specifically updating/calculating probability scores. Methodology 600 then moves to block 624 to further define, adjust and/or track the relevant trigger zones. It is again noted that additional details about the definition, adjustment and tracking of both miss zones and trigger zones are provided later in this disclosure in connection with the descriptions of FIGS. 7A to 8B.

Methodology 600 then proceeds to decision block 626 to determine whether the tag is now in a "potentially localized" status. If the answer to the inquiry at decision block 626 is no, methodology 600 returns to the input to block 604 to process the next tag. If the answer to the inquiry at decision block 626 is yes, methodology 600 proceeds to decision block 628 to determine whether the potentially localized tag can be "verified." As previously noted, because the tag may have been moved during the semi-detection process, there is a possibility that the initial determination that the tag has been located could be wrong. Hence, this initial determination is labeled as a "potential" localization, and the initial determination is supplemented with another localization process, such as a directional read process. A directional read is an accurate method of identifying an object's location, but it typically takes up significant system resources and requires time to complete. Here, the accumulated data for the potentially localized tag is drawn upon to focus and streamline the directional read process so it consumes far fewer resources and requires much less time to complete that a full directional read process. If the streamlined supplemental localization process at decision block 628 is successful, methodology 600 proceeds to block 630 to update the relevant tag data in the lookup table. From block 630, methodology 600 returns to block 604 to process the next tag. If the streamlined supplemental localization process at decision block 628 is not successful, the tag is returned to a "semi-detected" status and methodology 600 returns to block 604 to process the next tag.

The present disclosure, and in particular methodology 600, utilizes a primary localization process to narrow down the trigger zone until there is a potential localization of the tag. The primary localization actions in methodology 600 are represented by block 624 and decision block 626. A supplemental localization process is then applied to the narrowed trigger zone to either verify that the potential localization is correct or determine that the potential localization is wrong. The supplemental localization actions in methodology 600 are represented by decision block 628 and block 630. Thus, the efficiency of the supplemental localization process is improved and focused by the data gathered through the primary localization process. In one or more embodiments, the primary localization process is a trilateration process, and the supplemental localization process is a directional read process. Alternatively, the primary localization process could be a directional read process, and the supplemental localization process could be a trilateration process.

In geometry, trilateration is the process of determining absolute or relative locations of points by measurement of distances, using the geometry of circles, spheres or triangles. In addition to its interest as a geometric problem, trilateration has practical applications in surveying and navigation, including global positioning systems (GPS). In two-dimensional geometry, it is known that if a point lies on two circles, then the circle centers and the two radii provide sufficient information to narrow the possible locations down to two. Additional circle centers and radii may be used to iteratively narrow the possibilities down to one unique location. In three-dimensional geometry, when it is known that a point lies on the surfaces of three spheres, then the centers of the three spheres along with their radii provide sufficient information to narrow the possible locations down to no more than two (unless the centers lie on a straight line). Additional circle centers and radii may be used to iteratively narrow the possibilities down to one unique location.

Directional read processes search for a tag by looking in a particular direction for the tag, then stepping through an incremental scan until the scan region is covered. The scan increments are typically small. For example, a directional read scan might begin its search at 0.0 degrees, then move to 0.1 degrees, then move to 0.2 degrees, and continue until the entire scan region is covered. In a three-dimensional geometry, the directional read will scan the three-dimensional surrounding incrementally.

Figure 7A:
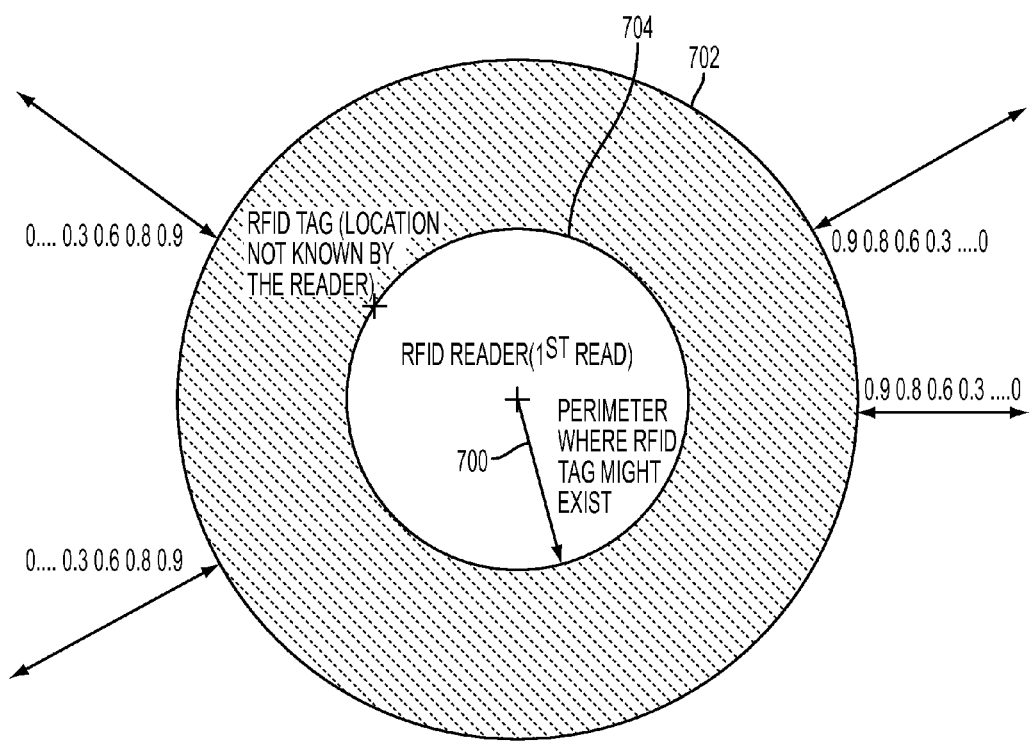
FIG. 7A depicts a diagram illustrating an example of how portions of the methodology shown in FIG. 6 may be implemented in accordance with one or more embodiments.

With reference now to FIGS. 7A-7D, additional details of processes for determining the location of a semi-detected object will now be provided. The illustrated examples are an application of a trilateration process to locate an object. For ease of illustration and discussion, the illustrated examples are shown in two-dimensional (2D) space. However, the same principles apply to real life three-dimensional (3D) applications. FIG. 7A illustrates an RFID reader using a trilateration process to make a first read in which it detects an RFID tag within the reader's detection range. More specifically, RFID reader can determine a distance from the RFID reader to the detected tag, but does not yet know in which direction the RFID tag is located. As shown, the RFID reader is in a particular location, and directional arrow 700 represents a distance from the RFID reader to the RFID tag. Thus, circle 702 represents the RFID reader's detection range, and circle 704 represents a perimeter where the RFID tag might exist. The RFID tag is at the location shown on circle 704, but the RFID reader does not yet have enough reads to know this location. The perimeter of circle 702 is the initial trigger zone of the RFID tag. The RFID reader's location may be determined using a wide variety of localization technologies, including GPS, Wi-Fi, cell tower signals and others.

FIG. 7A also illustrates how probability scores may be determined and utilized. The trigger zone is defined, adjusted and tracked using probability and given a score. In the disclosed example, the region inside circle 704 is given a probability score of one (1). As the RFID reader moves outward from the center of circle 704, the chances of detecting the RFID tag from the new RFID reader location is lower. Therefore, as the RFID reader continues to move further away from the center of circle 704, the probability score decreases. This decrease is shown by the four directional arrows marked by probability numbers that decrease (0.9 to 0.8 to 0.6 to 0.3 . . . 0.0) as one moves in any direction away from the center of circle 704.

Figure 7B:
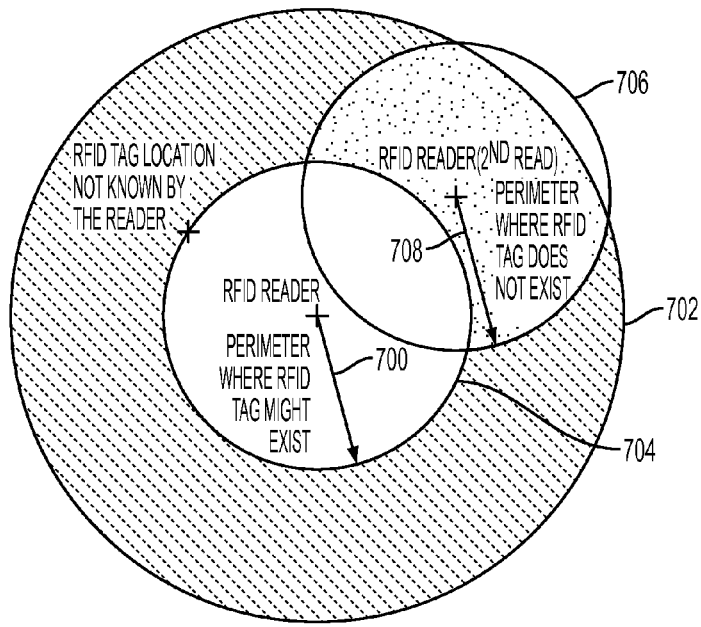
FIG. 7B depicts a diagram further illustrating an example of how portions of the methodology shown in FIG. 6 may be implemented in accordance with one or more embodiments.

In FIG. 7B, the RFID reader has now moved to another location and makes a subsequent read. As shown, the RFID tag is in the same location, which is now outside the RFID reader's range, so the RFID tag is not detected. The RFID reader marks the region defined by directional arrow 708 and circle 706 as a region where the RFID tag does not exist. Thus, circle 706 defines a miss zone for the RFID tag.

Figure 7C:
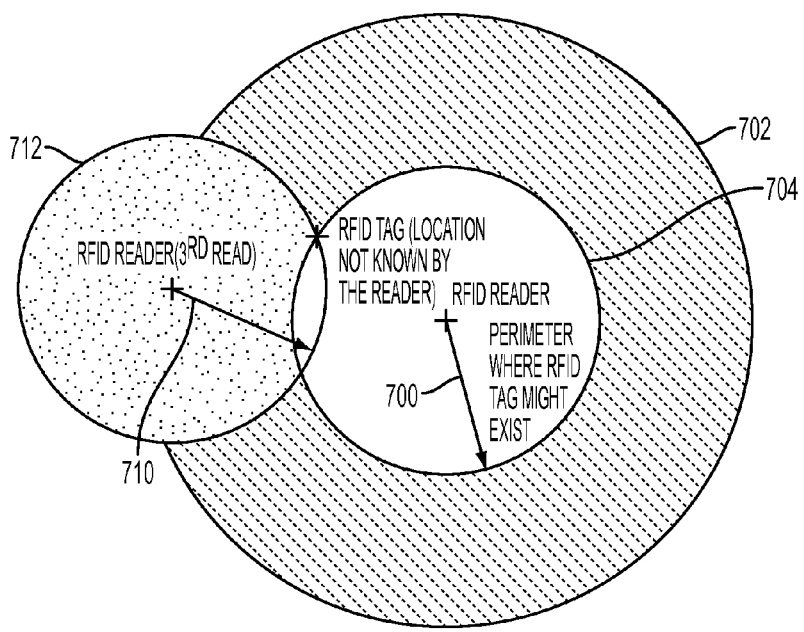
FIG. 7C depicts a diagram further illustrating an example of how portions of the methodology shown FIG. 6 may be implemented in accordance with one or more embodiments.
Figure 7D:
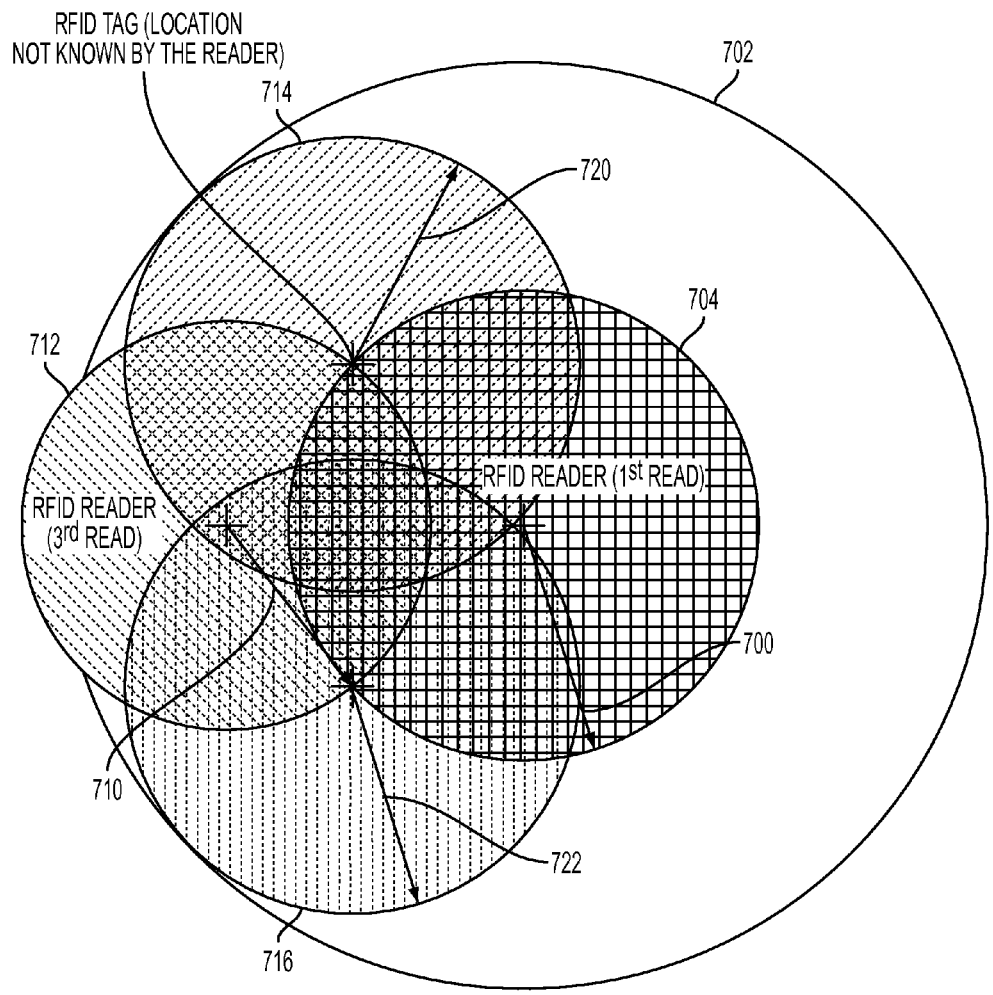
FIG. 7D depicts a diagram further illustrating an example of how portions of the methodology shown FIG. 6 may be implemented in accordance with one or more embodiments.

In FIG. 7C, the RFID reader has now moved to another location and makes a subsequent read. As shown, the RFID tag is in the same location, which is now again within RFID reader's range, so the RFID tag is detected. As shown, the directional arrow 710 represents a distance from the current location of the RFID reader to the RFID tag. Thus, circle 712 represents another perimeter where the RFID tag might exist. The RFID tag is in fact at the location shown at one intersection of circle 712 with circle 704, but the RFID reader does not yet have enough reads to know this location. However, with the second detection (made by the $3^{rd}$ READ), the trigger zone has now evolved from the perimeter of circle 702 as shown in FIG. 7A to the circles 714, 716 as shown in FIG. 7D. Circle 714 centers on one intersection between circles 712 and 704, and circle 716 centers on the other intersection between circles 712 and 704. A radius 720 of circle 714 is preferably the maximum known detectable distance between the RFID reader and the RFID tag. Similarly, a radius 722 of circle 716 is preferably the maximum known detectable distance between the RFID reader and the RFID tag.

The RFID reader attached to a small and potentially wearable computing device continues to move around, ad hoc, and take additional reads. Using the trilateration process, with each additional read either the RFID tag is detected or it is not. If the RFID tag is not detected, additional miss zone data are determined, added to the list of previous miss zones and tracked. If the RFID tag is detected, additional trigger zone data is accumulated and the trigger zone, through additional trilateration iterations is continuously narrowed until the trilateration process converges to a potential localization.

Figure 8A:
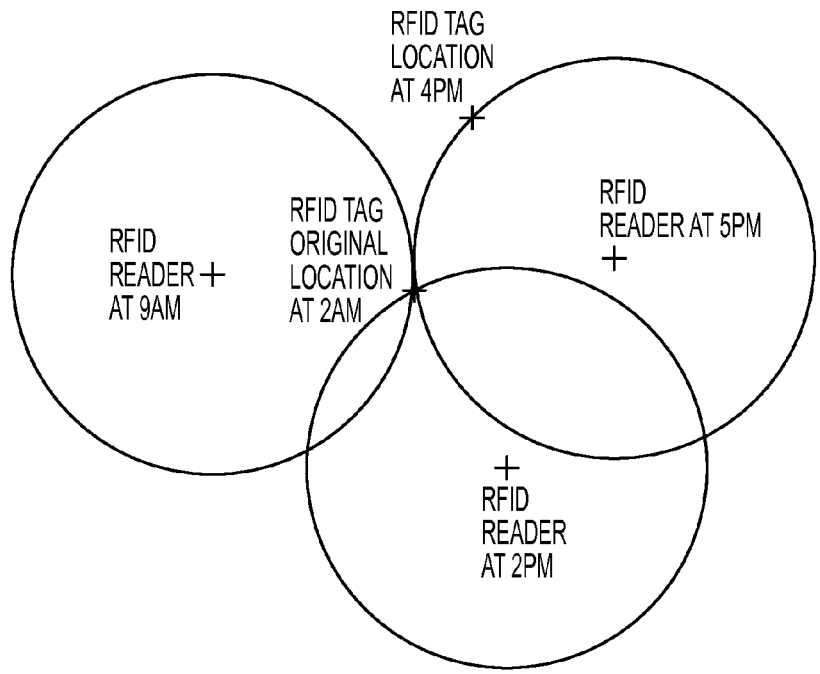
FIG. 8A depicts a diagram further illustrating an example of how portions of the methodology shown in FIG. 6 may be implemented in accordance with one or more embodiments.
Figure 8B:
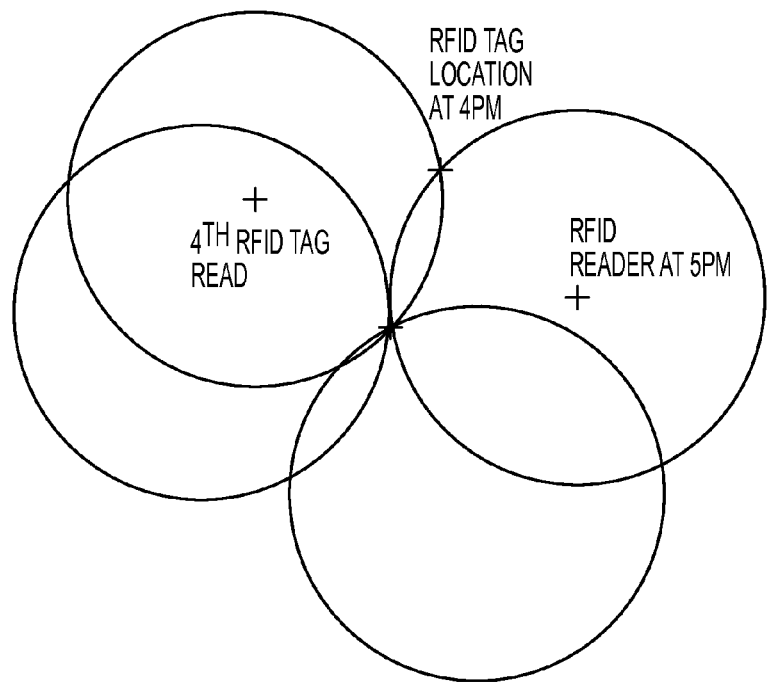
FIG. 8B depicts a diagram further illustrating an example of how portions of the methodology shown in FIG. 6 may be implemented in accordance with one or more embodiments.

With reference now to FIGS. 8A and 8B, additional details of processes for verifying that the semi-detected object localization is correct will now be provided. As shown, because of the typically long time between reads, it is possible that an RFID tag may be moved at some point after its first read. In the example illustrated in FIG. 8A, RFID tag was at one location at 2:00 a.m., and then subsequently moved to a second location at 4:00 p.m. RFID reader makes an initial reading from a first location at 9:00 a.m., a second reading from a second location at 2:00 p.m., and a third reading from a third location at 5:00 p.m. Between the second and third RFID reader readings, RFID tag moved to its second location. At the third RFID reading at 5:00 p.m., the RFID reader reaches a potential localization conclusion that the RFID tag is currently at its 2:00 a.m. location, which is wrong. As shown in FIG. 8A, performing additional trilateration reads still might not resolve the problem.

Instead of continuing with additional trilateration reads, the present disclosure applies a targeted directional read process to supplement and verify the potential localization shown in FIG. 8A. Thus, the present disclosure, and in particular methodology 600, utilizes a supplemental localization process applied to the narrowed trigger zone to either verify that the potential localization is correct, or determine that the potential localization is wrong. The supplemental localization actions in methodology 600 are represented by decision block 628 and block 630. Directional read processes search for a tag by looking in a particular direction for the tag, then stepping through an incremental scan until the scan region is covered. The scan increments are typically small. For example, a directional read scan might begin its search at 0.0 degrees, then move to 0.1 degrees, then move to 0.2 degrees, and continue until the entire scan region is covered.

Thus, it can be seen from the forgoing that technical benefits of the present disclosure include systems and methodologies for localizing movable ID tags during ad hoc, normal course movement of an ID reader attached to a relatively small and potentially wearable computing device. The present disclosure localizes objects attached to ID tags while a user is walking around an area (e.g., rooms of home) in the normal course without purposely positioning the ID reader.

To accommodate the environmental, cost and size constraints of a small and potentially wearable object ID system, the disclosed object ID system utilizes a single reader that processes ID tag readings one at a time over a relatively long period of time. Even under such constraints, the disclosed systems and methodologies can localize ID tag that are moved either during localization or after localization has been verified.

The present disclosure further provides a communications network through which multiple movable readers on the network can draw on the information accumulated in other movable readers on the same network when performing the above-described localization probability calculations, semi-detection process, potential localization process and verification process, thereby working both individually and jointly to identify, locate and track ID tags. Such a network can increase the validation frequency of object location for the object ID system, which is a concept similar to crowd sourcing.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The descriptions of the various embodiments of the present disclosure have been presented for purposes of illustration, but are not intended to be exhaustive or limited to the embodiments disclosed. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of performing an object identification (ID), the method comprising: using a movable reader to determine:
   a presence of an ID tag;
   an absence of said ID tag; and
   that said ID tag has moved from one location to another location; and
   the method further comprising: using the movable reader to:
   determine a localization probability score of said ID tag; and
   based on said localization probability score, adjusting a determination by said movable reader of said presence of said ID tag.

2. An object identification (ID) system comprising;
   a movable reader configured to define, adjust and track a first trigger zone of a first ID tag by determining a presence of said first ID tag within said first trigger zone;
   said movable reader further configured to define, adjust and track a first miss zone of said first ID tag by determining an absence of said first ID tag from said first miss zone; and
   said movable reader further configured to determine a first localization probability score of said first ID tag;

wherein said first localization probability score comprises a likelihood that said movable reader will, while at a first current location, determine said presence of said first ID tag.

3. The object ID system of claim 2, wherein said movable reader is further configured to, based on said first localization probability score, make a first adjustment to said movable reader determining said presence of said first ID tag.

4. The object ID system of claim 2, wherein said first localization probability score is based on:
   said first current location of said movable reader;
   a distance between said movable reader and said first trigger zone; and
   a distance between said movable reader and said first miss zone.

5. The object ID system of claim 2, further comprising:
   a mobile device capable of ad hoc, unscripted movements from one location to another location; and
   said movable reader further configured to be incorporated with said mobile device;
   wherein said determination of said presence of said first ID tag within said first trigger zone is accomplished during said ad hoc, unscripted movements from one location to another location.

6. The object ID system of claim 2, wherein said movable reader comprises a remote host computer.

7. The object ID system of claim 2, wherein said movable reader comprises an integrated host computer.

8. The object ID system of claim 2, further comprising;
   said movable reader further configured to define, adjust and track a second trigger zone of a second ID tag by determining a presence of said second ID tag within said second trigger zone;
   said movable reader further configured to define, adjust and track a second miss zone of said second ID tag by determining an absence of said second ID tag from said second miss zone; and
   said movable reader further configured to determine a second localization probability score of said second ID tag;
   wherein said second localization probability score comprises a likelihood that said movable reader will, while at a second current location, determine said presence of said second ID tag.

9. The object ID system of claim 8, wherein said movable reader is further configured to, based on said second localization probability score, make a second adjustment to said movable reader determining said presence of said second ID tag.

10. The object ID system of claim 8, wherein said movable reader is further configured to, based on a comparison between said first localization probability score and said second localization probability score, prioritize determining said presence of said first ID tag over determining said presence of said second ID tag.

11. The object ID system of claim 2, wherein said movable reader is further configured to determine a potential localization of said first ID tag by said determination of said presence of said first ID tag within said first trigger zone.

12. The object ID system of claim 11, wherein said movable reader is further configured to determine a verification of said potential localization of said first ID tag.

13. The object ID system of claim 12, wherein said movable reader is further configured to:
    determine said potential localization of said first ID tag by a trilateration process; and
    determine said verification of said potential localization of said first ID tag by a directional read process.

14. The object ID system of claim 13, wherein said movable reader is further configured to utilize data of said trilateration process to limit a scope of said directional read process.

15. The object ID system of claim 12, wherein said movable reader is further configured to:
    determine that said verification of said potential localization is no longer accurate; and
    initiate a new search for a new presence of said first ID tag.

16. The object ID system of claim 15, wherein said movable reader is further configured to:
    determine a presence of said first ID tag within a new first trigger zone;
    determine that said new first trigger zone overlaps said first trigger zone;
    determine a new potential localization of said first ID tag within said new first trigger zone; and
    determine a verification of said new potential localization of said first ID tag.

17. The object ID system of claim 15, wherein said movable reader is further configured to:
    determine a presence of said first ID tag within a new first trigger zone;
    determine that said new first trigger zone does not overlap said first trigger zone;
    define, adjust and track said new first trigger zone of said first ID tag by determining a presence of said first ID tag within said new first trigger zone;
    define, adjust and track a new first miss zone of said first ID tag by determining an absence of said first ID tag from said new first miss zone; and
    determine a new first localization probability score of said first ID tag;
    wherein said new first localization probability score comprises a likelihood that said movable reader will, while at a new first current location, determine said presence of said first ID tag.

18. An object identification (ID) system, comprising:
    a first movable reader configured to define, adjust and track a first trigger zone of a first ID tag by determining a presence of said first ID tag within said first trigger zone;
    a second movable reader configured to define, adjust and track said first trigger zone of said first ID tag by determining said presence of said first ID tag within said first trigger zone; and
    a communications network connecting said first movable reader and said second movable reader;
    wherein said first movable reader is further configured to access and utilize, through said communications network, stored data of said second movable reader to define, adjust and track said first trigger zone of said first ID tag.

19. The object ID system of claim 18, wherein said second movable reader is configured to access and utilize, through said communications network, stored data of said first movable reader to define, adjust and track said first trigger zone of said first ID tag.

* * * * *